(12) United States Patent
Rivera et al.

(10) Patent No.: US 8,475,185 B2
(45) Date of Patent: Jul. 2, 2013

(54) SOLAR PANELS GROUNDING CLIP

(75) Inventors: Angel M. Rivera, Newburgh, NY (US);
Stanley E. Mayer, Middletown, NY (US)

(73) Assignee: Solar Mounting Solutions, LLC, Newburgh, NY (US)

( * ) Notice: Subject to any disclaimer, the term of this patent is extended or adjusted under 35 U.S.C. 154(b) by 0 days.

(21) Appl. No.: 13/425,916

(22) Filed: Mar. 21, 2012

(65) Prior Publication Data
US 2012/0244729 A1    Sep. 27, 2012

Related U.S. Application Data

(60) Provisional application No. 61/467,245, filed on Mar. 24, 2011.

(51) Int. Cl.
*H01R 4/66* (2006.01)

(52) U.S. Cl.
USPC .......................................................... 439/97

(58) Field of Classification Search
USPC ............................. 439/97, 883, 444, 397, 927
See application file for complete search history.

(56) References Cited

U.S. PATENT DOCUMENTS

| | | | |
|---|---|---|---|
| 5,100,506 A * | 3/1992 | Sturtevant et al. | 216/47 |
| 5,435,746 A * | 7/1995 | Leeb | 439/387 |
| 5,501,008 A * | 3/1996 | Leeb | 29/849 |
| 6,368,038 B1 * | 4/2002 | Uno | 411/161 |
| 7,435,134 B2 | 10/2008 | Lenox | |
| 8,092,129 B2 | 1/2012 | Wiley et al. | |
| 8,303,357 B2 * | 11/2012 | Kuwahara et al. | 439/883 |
| 2010/0175337 A1 | 7/2010 | Mascolo et al. | |
| 2010/0269891 A1 | 10/2010 | Kinard et al. | |

FOREIGN PATENT DOCUMENTS

EP    0977274    3/2006

OTHER PUBLICATIONS

Written Opinion of the International Searching Authority, PCT/US2012/030050, Korean Intellectual Property Office, Oct. 29, 2012.

* cited by examiner

*Primary Examiner* — Jean F Duverne
(74) *Attorney, Agent, or Firm* — Tracy Jong Law Frim; Tracy P. Jong; Cheng Ning Jong

(57) ABSTRACT

A grounding clip for electrically bonding at least three objects in one action. In use, the grounding clip is interposed between at least three objects such that the first and second banks of teeth are configured to penetrate the objects to electrically bond them. The grounding clip has a planar body, a pair of opposingly disposed first banks of teeth that extend downwardly and outwardly from the planar body at an angle. There is also a pair of opposingly disposed second banks of teeth formed of a rotatable plate disposed in a plane at an angle and extending downwardly and outwardly from the planar body. The second banks of teeth terminate in a plurality of second teeth disposed upwardly and in an angled plane with respect to the rotatable plate.

20 Claims, 11 Drawing Sheets

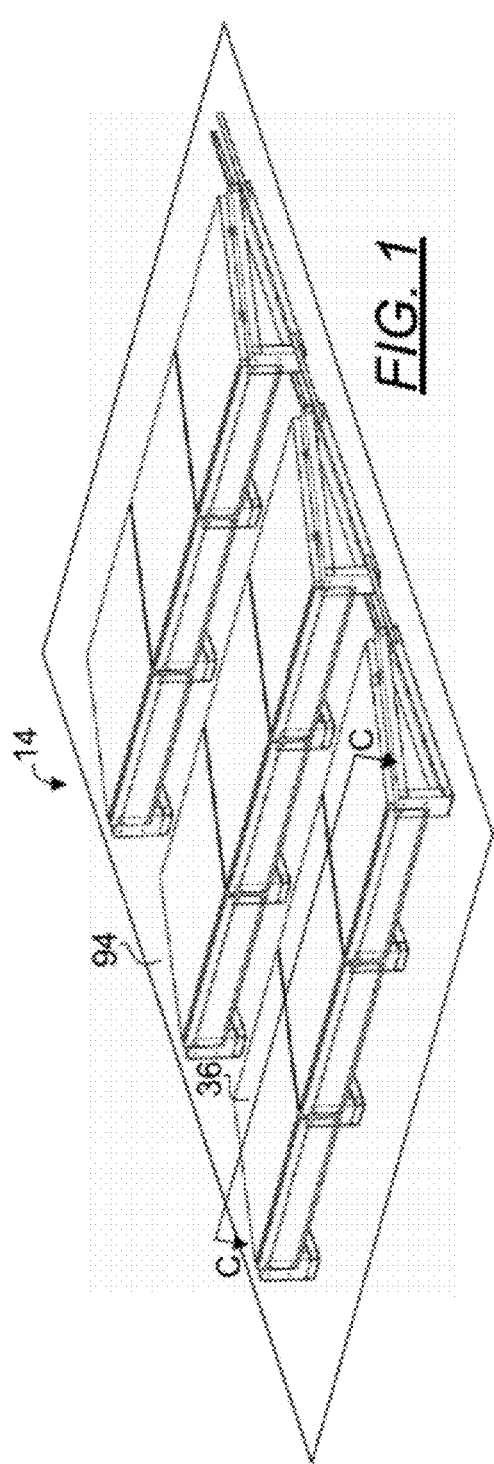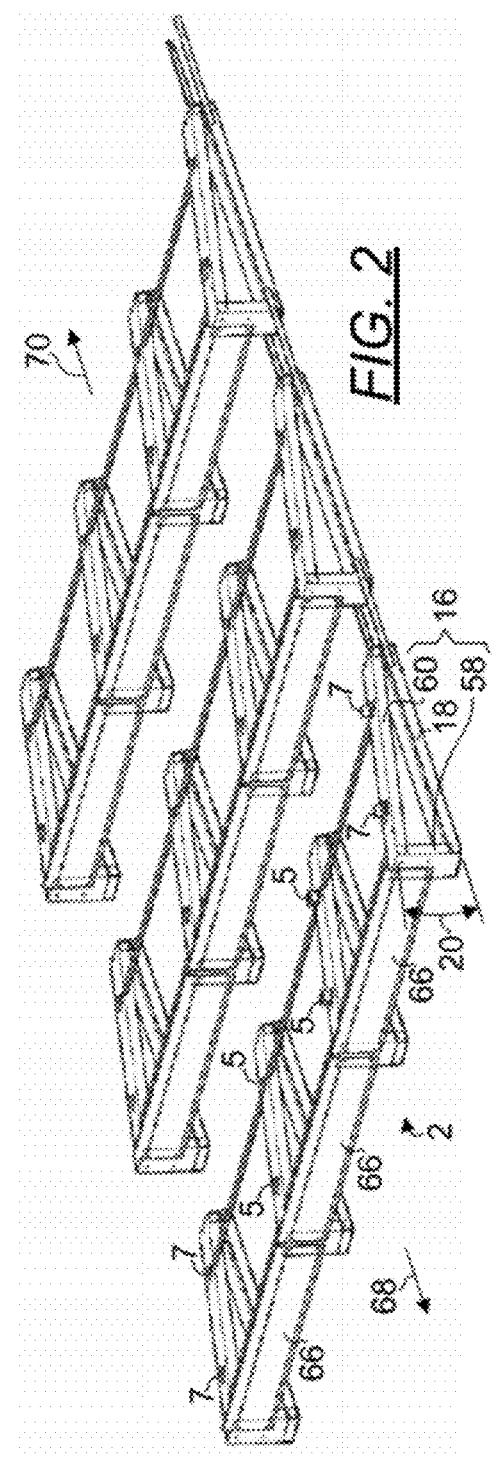

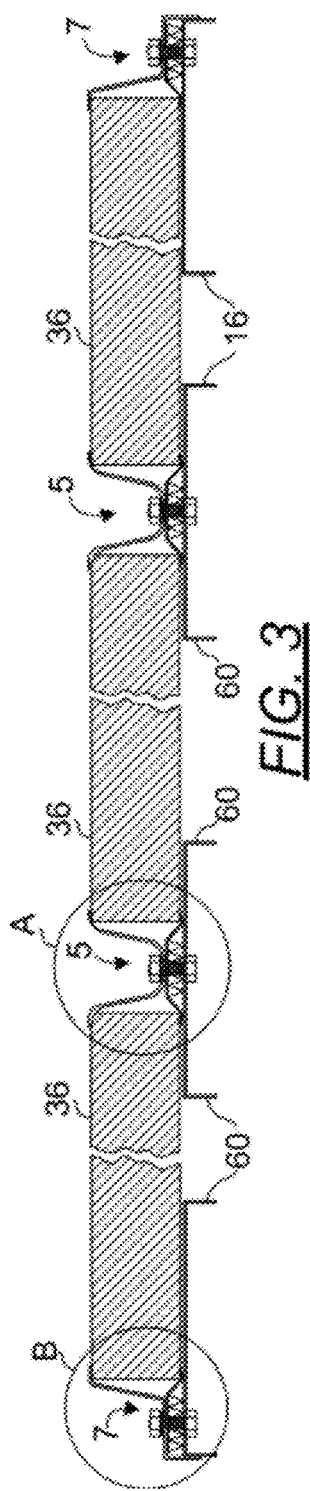
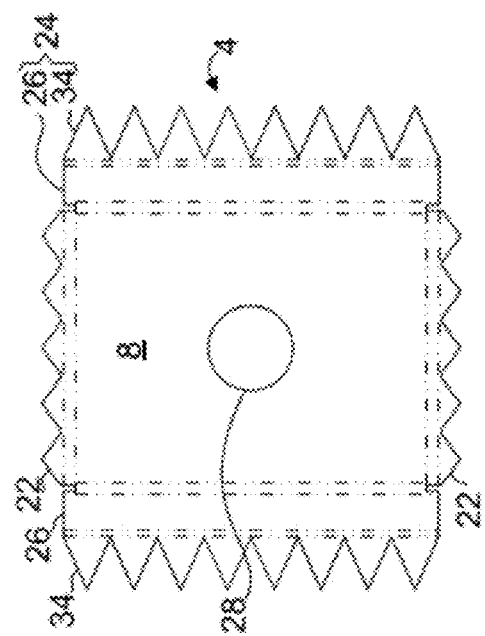
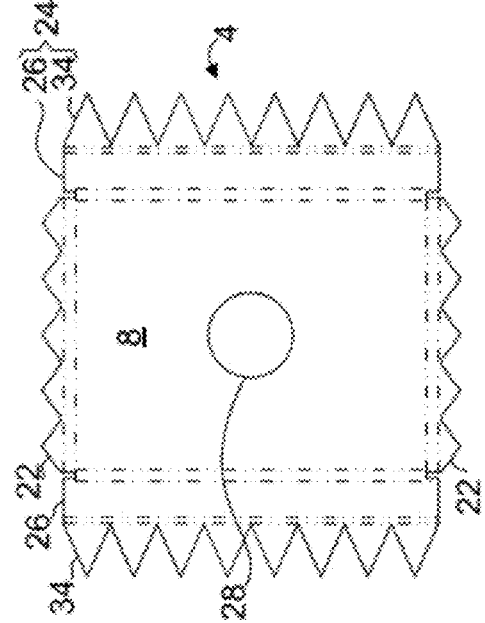

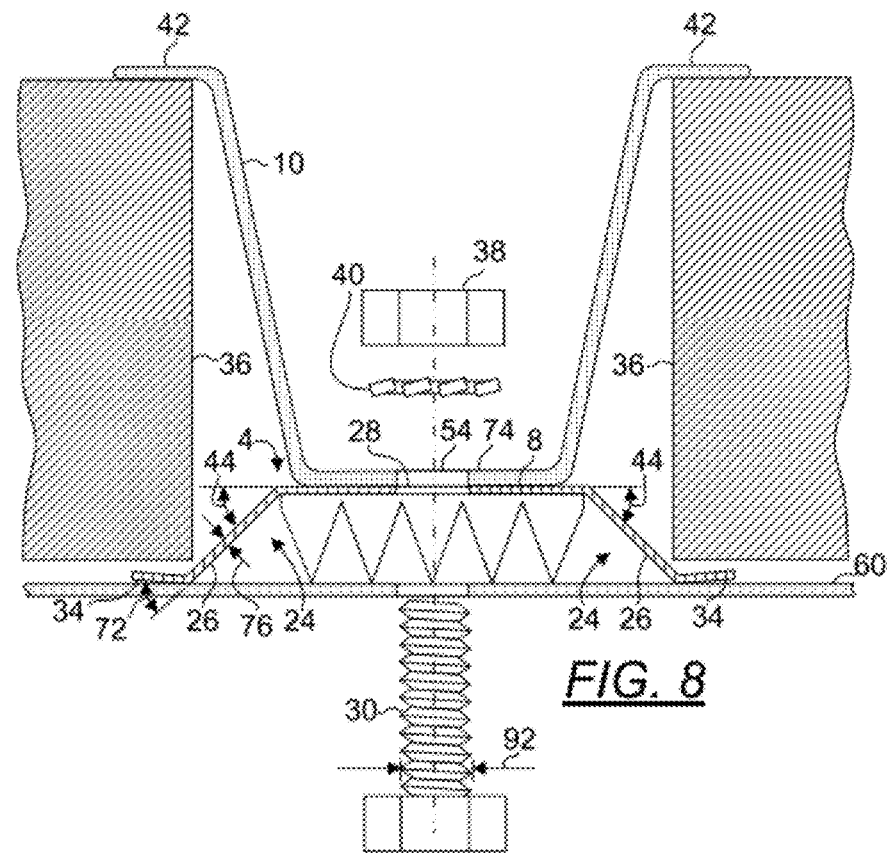
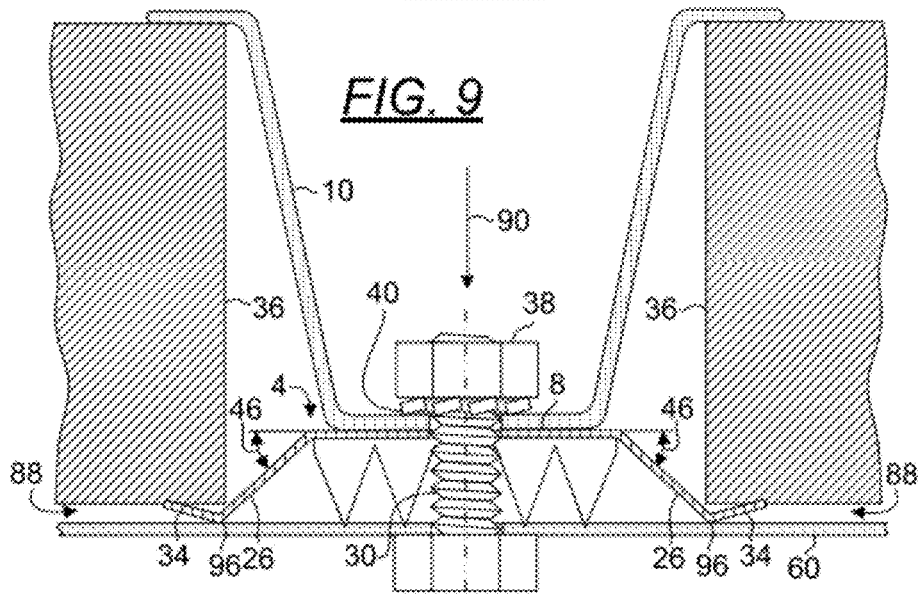

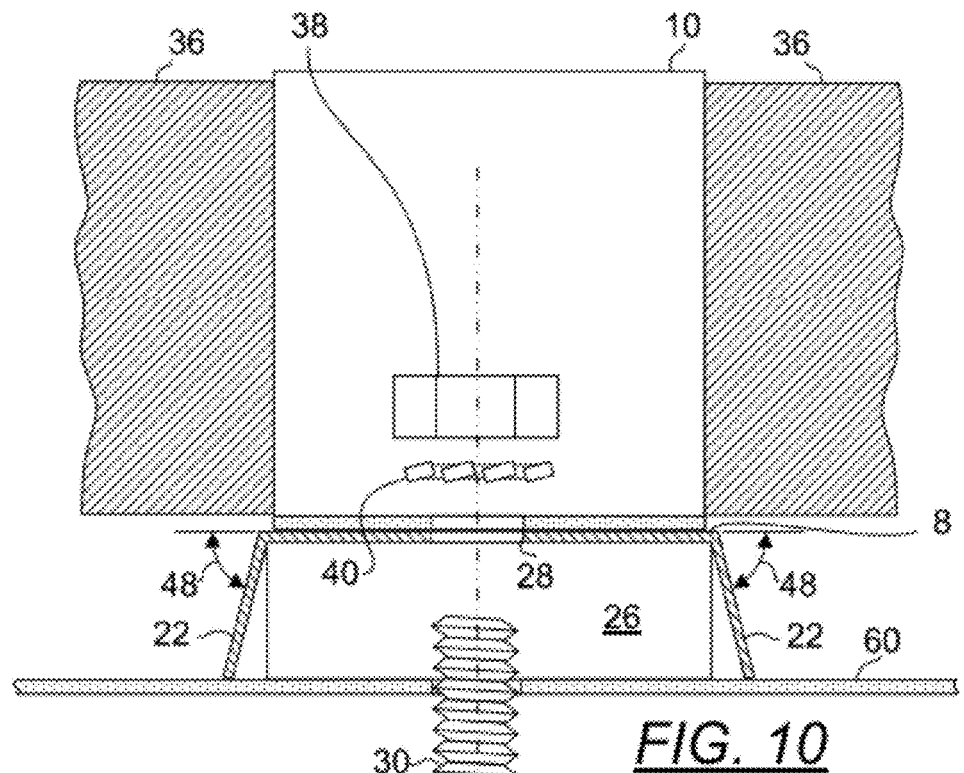
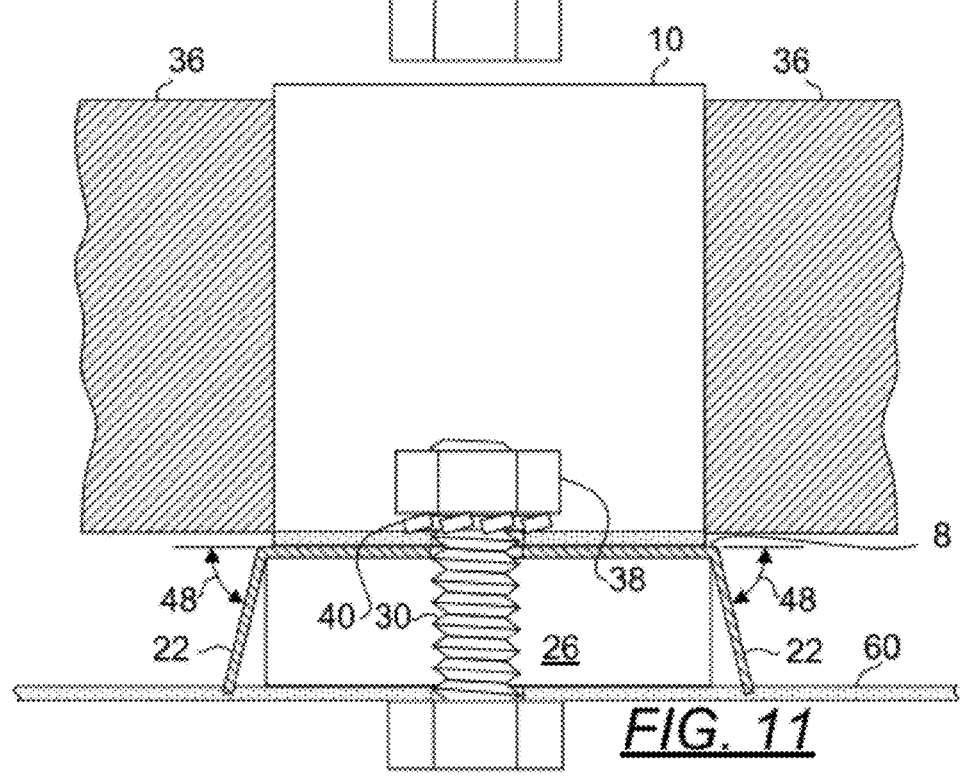

SOLAR PANELS GROUNDING CLIP

RELATED APPLICATIONS AND PRIORITY CLAIM

This application claims priority to provisional application U.S. Ser. No. 61/467,245 filed Mar. 24, 2011. Said application is incorporated by reference herein in its entirety.

BACKGROUND OF THE INVENTION

1. The Field of the Invention

The present invention is directed generally to grounding clips, and in particular, to grounding clips for solar panels.

2. Background Art

Recent advancements in solar cell technology and skyrocketing fossil fuel prices have prompted many businesses to consider solar energy as an alternative energy source. Many commercial buildings have flat roofs. These large expanses of flat spaces present ideal opportunities to place solar panels as they are typically not publicly accessible and free from significant natural debris such as leaves or shade cast by trees or buildings.

As labor costs are high, it is imperative to resort to a solar racking system having a grounding system that is simple to install, one that does not require highly trained professionals to be present at all times. For example, installation costs can be reduced if the electrician is only required to be present only when solar panels are ready to be electrically enabled.

The present ground clip has been devised for use in installing a solar panel array composed of multiple photovoltaic or solar panels that are assembled onto a racking system. The frames of solar panels are generally fabricated from aluminum and the racking system on which the solar panels are mounted are generally fabricated from steel or aluminum. If Aluminum is used, it is anodized to resist corrosion. If steel is used, Galvalume® and/or powder coating may be applied to prevent corrosion. As in any source of electrical power, to ensure safety, any racking system and solar panel frames must be electrically bonded together. As used herein, the term "bonded" means permanently joined to form an electrically conductive path that ensures electrical continuity and has the capacity to safely conduct any current likely to be imposed. Although the frames of the solar panels are directly clamped to a racking system or otherwise in abutting contact with the racking system, the anodizing of the frames insulates the frames and the racking system so that they are not electrically connected together.

A common practice in the industry is to install a separate grounding lug on each solar panel and running a ground wire from panel to panel. The grounding lug is attached to the extruded aluminum frame of the solar panels with a thread forming stainless steel screw. As the screw cuts into the aluminum, it forms an air-tight connection which will maintain good electrical connection over time. A common sheet metal thickness is 0.080 inch (2 mm) and a common screw size is 10-32. The screw therefore only makes connection on about 2.5 threads. This gives a marginally acceptable surface contact area in terms of mechanical strength and electrical conductivity. It would be desirable to have a design where the electrical contact area can be made much larger.

In a conventional grounding setup, a stainless steel screw contacts a star washer which in turn contacts the grounding lug body. The grounding lug accepts a copper wire which is forced to contact the grounding lug by a stainless steel set screw. In some occasions, the copper wire could also be crimped to the lug. There are thus four connection points which must be made, i.e., sheet metal to screw, screw to star washer, star washer to lug, and lug to copper wire. It would be desirable to have a design where there are only two electrical connection points when electrically bonding two objects to reduce installation time, risk and effort.

Copper wire is strung between grounding lugs on all the solar panels and eventually to a ground electrode. The grounding lugs themselves are expensive and time consuming to install and the wiring adds both material and labor cost which increase the price of the overall system. It would be preferable if the electrical connection was made directly between the metal pieces when they are assembled together.

Given these concerns, several solar panel support systems have been designed to solve some of these problems. However, none of the prior art systems are designed to capable of addressing all of these concerns.

U.S. Pat. No. 8,092,129 to Wiley et al. discloses a bonding washer for making electrical connection between two metal pieces that are to be mechanically fastened together. The washer, to be interposed between the solar panel and mounting system, is constructed so as to fasten to one of the pieces before the two pieces are joined. Teeth on the washer, positioned at right angles to the plane of the washer, are forced into each of the two metal pieces when the fastener is tightened, making electrical connection between solar panel and mounting rail. This patent discloses a washer capable of electrically ground only two metal pieces. Although the washers of the '129 patent appear superior as compared to conventional grounding practices using grounding lugs, they are limited in their ability to reduce the number of grounding clips required to ground a racking system and the solar panels mounted on the racking system.

Thus, there arises a need for a solar panel grounding system which is simple in construction and installation, one that does not require regular maintenance, one that provides superior grounding to conventional grounding methods and one that does not require modifications to existing flat roofs on which the racking system is used.

SUMMARY OF THE INVENTION

The present invention is directed toward a grounding clip comprising a body or main plate, a pair of first banks of teeth and a pair of second banks of teeth. The main plate comprises a plurality of edges and it is disposed in a main plane. The pair of first banks of teeth are disposed on two first opposing edges of the main plate with each first bank of teeth comprising a plurality of first teeth extending downwardly and outwardly from one of the two first opposing edges, wherein the plurality of first teeth are disposed in a plane at a first angle with respect to the main plane. The pair of second banks of teeth are disposed on two second opposing edges of the main plate, each second bank of teeth comprising a rotatable plate extending downwardly and outwardly from one of the two second opposing edges and a plurality of second teeth is affixed to a free edge of the rotatable plate, wherein the rotatable plate is disposed at a second angle with respect to the main plane. The plurality of second teeth are disposed in a plane at a third angle with respect to the rotatable plate. In one embodiment, the plurality of second teeth are bent upwardly at a fourth angle with respect to the rotatable plate to form bent tips.

In one preferred embodiment, the main plate is a rectangular plate. The grounding clip is preferably constructed from stainless steel.

Accordingly, it is a primary object of the present invention to provide an electrically effective grounding clip for connecting solar panels to an earth ground.

It is another object of the present invention to provide a grounding clip which reduces the number of distinct grounding connections required in a solar panel system.

It is a further object of the present invention to provide a cost effective grounding solution for solar panels in terms of initial material, installation and maintenance costs.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a top perspective view of a solar panel array disposed on a flat roof.

FIG. 2 is a racking system depicting three rows of framework for accommodating three solar panels each.

FIG. 3 is a front orthogonal sectional view of a plurality of installed solar panels as taken along line C-C of FIG. 1, depicting a means by which the solar panels are mounted according to the present invention.

FIG. 4 is a top perspective view of one embodiment of a grounding clip according to the present invention.

FIG. 5 is a top plan view of one embodiment of a grounding clip according to the present invention.

FIG. 8 is a front close-up partial cross-sectional view of a grounding assembly as taken from A of FIG. 3, but depicting the arrangement of a pre-assembled grounding assembly.

FIG. 9 is a front close-up partial cross-sectional view of a grounding assembly as taken from A of FIG. 3 with the grounding clip fastening system tightened.

FIG. 10 is a side orthogonal partial cross-sectional view of a grounding assembly as taken from A of FIG. 3, but depicting the arrangement of a pre-assembled grounding assembly.

FIG. 11 is a side orthogonal partial cross-sectional view of a grounding clip as taken from A of FIG. 3 with the grounding clip fastening system tightened.

Figure 6:
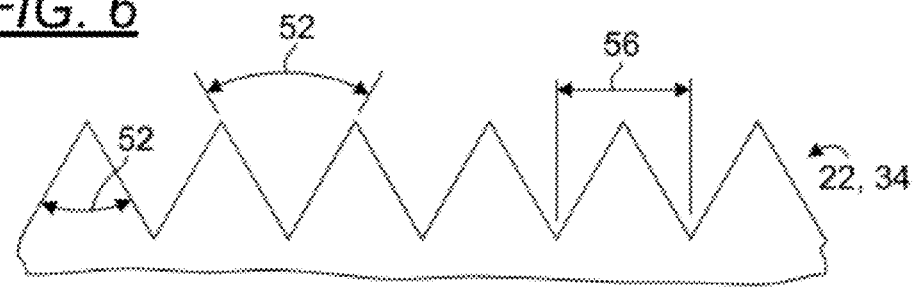
FIG. 6 is an orthogonal view of a partial bank of teeth depicting the geometrical properties of a present grounding clip.

The drawings are not to scale, in fact, some aspects have been emphasized for a better illustration and understanding of the written description.

PARTS LIST

2—solar panel racking system
4—grounding clip
5—grounding assembly
6—edge grounding clip
7—edge grounding assembly
8—main plate
10—retaining clip
12—edge retaining clip
14—solar panel array
16—top member
18—bottom member
20—solar panel pitch
22—first bank of teeth
24—second bank of teeth
26—rotatable plate
28—center hole of main plate
30—threaded screw
31—threaded stud
32—angle between top member and plane of second teeth
34—second teeth
36—solar panel
38—clamp nut
40—friction washer
42—flared edges of retaining clip
44—angle between main plate and rotatable plate of grounding clip prior to clamp down
46—angle between main plate and rotatable plate of grounding clip upon applying clamp down force
48—angle between first bank of teeth and main plate
50—blank edge
52—apex angle
54—center hole of retaining clip
56—width of a tooth
58—first channel section of top member
60—second channel section of top member
62—edge grounding clip with bent tips of second teeth 64—aperture in top member for receiving screw or stud
66—wind deflector
68—northerly direction
70—southerly direction
72—angle between rotatable plate and plane of second teeth
74—base of retaining clip
76—thickness of grounding clip
78—tip of second tooth
80—angle between tip of second tooth and plane of second teeth
82—Keps® nut
84—combination of Penn Engineering & Manufacturing Corp (PEM®) stud and plate where PEM® stud is mounted in a plate
86—grounding clip with bent tips of second teeth
88—unstressed height of grounding clip
90—W (force applied to grounding clip)
92—D (nominal diameter of bolt)
94—flat roof
96—inflection line between rotatable plate and second teeth
98—width of main plate
100—length of main plate

PARTICULAR ADVANTAGES OF THE INVENTION

The present grounding clip simplifies the means by which metal pieces are electrically grounded by reducing the number of grounding clips required to ground solar panels to a racking system. In one aspect, the grounding clip is used to ground two solar panels and a racking system. In a conventional grounding system, in order to bond three objects, at least two sets of grounding devices would be required if not more. One set of grounding device would electrically connect a first solar panel to a second solar panel and another set of grounding device would be used to connect either the first or second solar panel to the racking system. In another aspect not shown, the present grounding clip may be used to ground two solar panels and two electrically isolated objects, further reducing the number of distinct grounding connections that would be required. As an added benefit for using a lower number of grounding clips, the potential of having a defective grounding point is lowered. Further, the number of ground paths can be added with little additional effort if additional ground paths are desired. The present grounding clip reduces labor required to ground objects compared to conventional nut and bolt grounding devices. It eliminates the need for running copper wires from panel to panel.

The present grounding clip simplifies the means by which metal pieces are electrically grounded by reducing the number of steps required to ground solar panels. In order to ground two solar panels, a grounding clip is simply interposed between two solar panels and a racking system and the main plate of the grounding clip is compressed by tightening a screw-nut or bolt-nut assembly to cause grounding engagement of the grounding clip to the solar panels and the racking system simultaneously.

The present grounding clip is configured to ground solar panels without significantly modifying the solar panels or installing screws, studs, nuts, washers and other hardware on the solar panels. It is a common practice where solar panel and racking system manufacturers are two separate business entities. Conventional grounding techniques require coordination of grounding strategy between the solar panel and racking system manufacturers as the questions of which party to provide grounding cables, the size and length of cables, the size and number of screws, the types of studs, bolts, nuts, washers have to be resolved prior to the delivery and installation of a solar power system. The present grounding clip simplifies the design interface between these parties.

DETAILED DESCRIPTION OF A PREFERRED EMBODIMENT

As used herein, the terms "grounding" or "ground" shall be construed to mean electrically grounding ("ground") an object or bonding the object to a ground potential. As used herein, the term "bonding" means permanently joining to form an electrically conductive path that ensures electrical continuity and that the formed bond has the capacity to safely conduct any current likely to be imposed. The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The present invention is configured to electrically bond more than two objects with only one grounding clip and aids in meeting bonding and grounding requirements of UL2703. In one embodiment of the present invention, a grounding clip is used to electrically bond a first object, a second object and a third object where the first and second objects are substantially levelly disposed and are disposed above the third object.

FIG. 1 is a top perspective view of a solar panel array 14 disposed on a flat roof 94. FIG. 2 is a solar panel racking system 2 depicting three rows of framework for accommodating three solar panels 36 each. A plurality of grounding clip and edge grounding clip assemblies 5, 7 are used in the solar panel racking system 2. A flat roof racking system 2 is configured for receiving a plurality of solar panels 36, each solar panel 36 having an electrically conductive frame. The racking system 2 of FIG. 2 comprises a framework of three panel support structures. Each panel support structure comprises a first end, a second end, a top member 16 having a first channel section 58 and a second channel section 60 and two ends, and a bottom member 18 having a channel section and two ends. The substantially rectilinear first and second channel sections 58, 60 are disposed at an angle from one another and each end of the bottom member 18 is fixedly connected to one end of the top member 16 such that the top member is configured to make an angle 20 at the second end with the bottom member 18. In one embodiment, angle 20 ranges from about 5 to about 35 degrees. Each solar panel 36 is supported on two consecutive second channel sections 60 of two top members 16. A solar panel installation is typically carried out on site as it is impractical to pre-install various large components in the factory. It therefore is imperative to provide components which facilitate on-site installation. Applicants discovered that by incorporating the present grounding assemblies 5, 7, conventional grounding method utilizing ground wires and therefore their requisite securing hardware can be eliminated.

Each solar panel 36 is secured to a top member 16 at four locations by either four grounding assemblies 5 or two grounding assemblies 5 and two edge grounding assemblies 7.

In use, the panel support structures are preferably disposed such that the first end is disposed in the northerly direction 68 and the second end in the southerly direction. A wind deflector 66 is further disposed on each of the northernmost row of panel support structures. The wind deflector 66 is provided to lower potential lifting of the solar panels 36 and the racking system 2 due to wind gusts which may enter the space under the solar panels 36. A plurality of grounding clip and edge grounding clip assemblies 5, 7 are disposed on and configured to be electrically conductive with each of the second channel sections 60. Each grounding assembly 5, 7 is configured to secure and be electrically common with the frames of the plurality of solar panels 36.

All components of the racking system 2, with the exception of the grounding and edge grounding clips 4, 6, are typically painted, anodized or otherwise protective coated for aesthetics and protection from environmental elements. In one preferred embodiment, the top member 16 is constructed from steel and coated with Galvalume®. In another embodiment, the top member 16 is base coated with Galvalume® and then powder coated over the Galvalume® layer to provide additional corrosion protection. As used herein and in one aspect, the powder can be a thermoplastic or a thermoset polymer. In one embodiment, the powder is polyester. Weights or ballasts are typically placed over portions of the bottom members 18 as dictated by ballasting requirements of a particular locale. Solar panel frames are typically constructed from anodized aluminum having anodized layer thickness of about 0.001 inch (0.03 mm).

FIG. 3 is a front orthogonal sectional view of a plurality of installed solar panels 36 as taken along line C-C of FIG. 1, depicting a means by which the solar panels 36 are mounted according to the present invention. Each grounding assembly 5 aids in securing and grounding two solar panels 36 while each edge grounding assembly 7 aids in securing one edge solar panel and grounds one solar panel 36. Referring back to FIG. 2, each solar panel 36 is supported and grounded either by four grounding assemblies 5 or two grounding assemblies 5 and two edge grounding assemblies 7.

FIGS. 4 and 5 are top perspective and top plan view, respectively, of one embodiment of a grounding clip 4 according to the present invention. The grounding clip 4 comprises a main plate 8, a pair of first banks of teeth and a pair of second banks of teeth. The main plate 8 is disposed in a main plane and comprises a plurality of edges. The pair of first banks 22 of teeth is disposed on two first opposing edges of the main plate 8. Each first bank of teeth comprises a plurality of first teeth disposed in a plane and extending downwardly and outwardly from one of the two first opposing edges, wherein each of the plurality of first teeth lies in a plane disposed at a first angle with respect to the main plane. The pair of second banks of teeth 24 is disposed on two second opposing edges of the main plate 8. Each second bank of teeth comprises a rotatable plate 26 disposed in a plane and extending downwardly and outwardly from one of the two second opposing edges. Each second bank of teeth further comprises a plurality of second teeth 34 disposed in a plane and affixed to a free edge of the rotatable plate 26. The plane of the rotatable plate 26 is disposed at a second angle with respect to the main plane and the plane of the plurality of second teeth 34 is disposed at a third angle 72 with respect to a plane in which the rotatable plate 26 lies. In one preferred embodiment, the main plate 8 is a rectangular plate. It shall be understood that the main plate 8 may take on other shapes such as circular, triangular, diamond or other polygons and the like, provided that the plate provides sufficient support for two pairs of substantially perpendicularly disposed teeth. The grounding clip is preferably constructed from a corrosion resistant and electrically conductive material, such as stainless steel. In one preferred embodiment, the stainless steel used is ½ hard stainless steel. In a preferred embodiment, the number of first teeth is about 10, i.e., 5 per bank and the number of second teeth is about 16, i.e., 8 per bank. The first, second and third angles are configured to prevent relative movement of the three bonded objects, i.e., two solar panels 36 and the top member 16 in the main plane. The second angle is configured to enable rotation of the rotatable plate 26.

FIG. 6 is an orthogonal view of a partial plurality of first and second teeth 22, 34, depicting the geometrical properties of a present grounding clip. Each first bank of teeth and the plurality of second teeth comprises a tooth density of from about 3 points per inch (25.4 mm) (1/width of a tooth 56) to about 20 points per inch (25.4 mm) and a tooth apex angle 52 of about 46 degrees.

Figure 7:
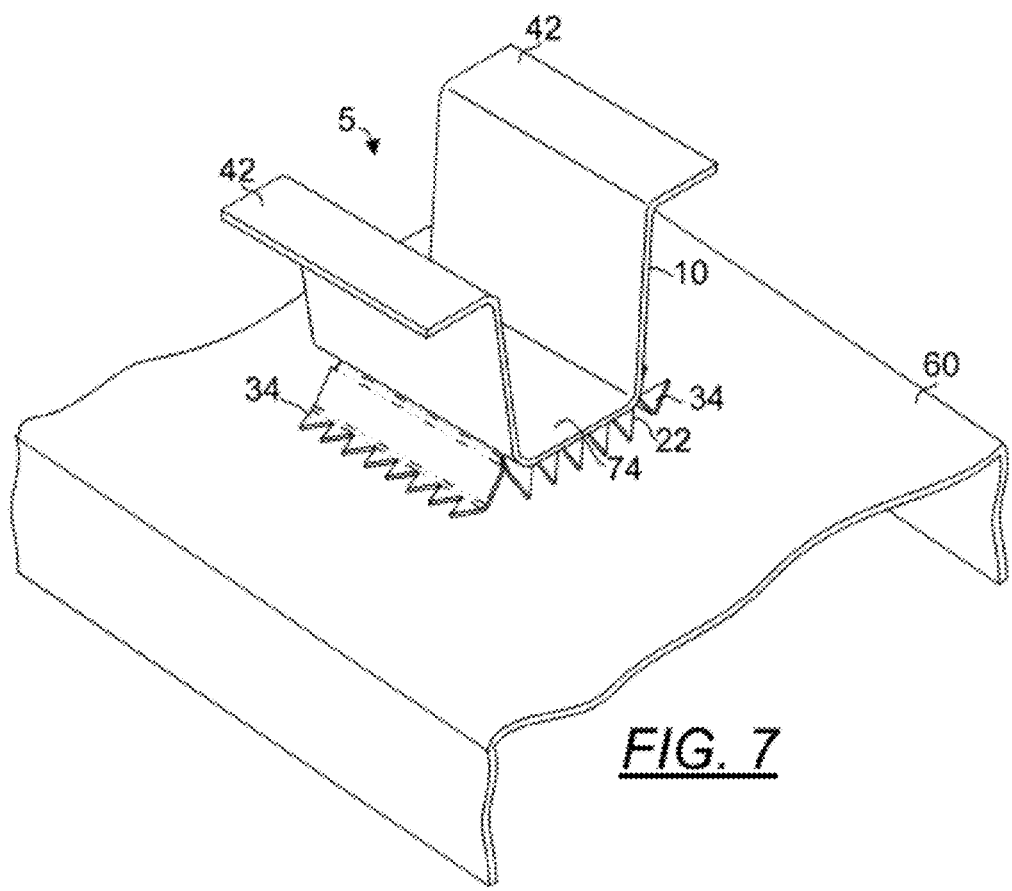
FIG. 7 depicts the use of a retaining clip used in conjunction with a grounding clip to form a grounding assembly.

FIG. 7 depicts the use of a retaining clip 10 used in conjunction with a grounding clip to form a grounding assembly 5. The grounding assembly 5 further comprises a retaining clip 10 comprising a channel having a base 74 and two flared edges 42, wherein the base 74 of the retaining clip is adapted to cooperate with the grounding clip 4 to secure a solar panel 36 to a top member 16. FIG. 8 is a front close-up partial cross-sectional view of a grounding assembly 5 as taken from A of FIG. 3, but depicting the arrangement of a pre-assembled grounding assembly 5. FIG. 9 is a front close-up partial cross-sectional view of a grounding assembly 5 as taken from A of FIG. 3 with the grounding clip fastening system 30, 38, 40 tightened. The grounding clip 4 is disposed with the pair of first banks of teeth facing the top member 16 and when the threaded screw 30 is tightened, each inflection line 96 between a rotatable plate 26 and second teeth 34 contacts a top member 16 causing the rotatable plate 26 to rotate outwardly and the second teeth to penetrate or bite through an anodized layer of a bottom portion of a solar panel 36 frame to cause electrical grounding and the pair of first banks of teeth is adapted to penetrate and cause electrical grounding with the top member 16.

During installation of a grounding assembly 5, a grounding clip 4 is positioned such that a threaded screws 30 goes through the center hole 28 of the grounding clip 4. A retaining clip 10 is then positioned over the grounding clip 4 by threading the screw 30 through the center hole 54 of the retaining clip 10. Upon disposing the retaining clip 10 atop the main plate 8 of the grounding clip 4 with its base 74 abutting the top surface of the main plate 8 and its centrally disposed hole 54 in alignment with centrally disposed hole 28 of the grounding clip 4, a friction washer 40 and a clamp nut 38 are then used to tighten the retaining clip 10 against the grounding clip 4. A Keps® nut may be utilized to replace the combination of the friction washer 40 and the clamp nut 38. The top member 16 is made of steel and in one embodiment and its thickness is 0.036 inch (0.9 mm). As the first and second teeth cut into the second channel section 60 of the top member 16, they form an air-tight connection which will maintain good electrical connection over time. In each grounding assembly 5, 7, there are eight grounding contact areas between a solar panel 36 and the grounding assembly 5, 7 and there are ten contact areas between the grounding assembly 5, 7 and the top member 16. As these contact areas are sufficiently large, they provide superior grounding over conventional grounding devices in addition to simplifying grounding design over conventional grounding devices. In one aspect, the force per tooth exerted on the solar panels 36 or top member 16 may be calculated as follows:

$$W=(T*(12))/r*D$$

where

W (or part 90)=Force applied to grounding clip (lbs)
T=Torque (ft-lbs)
r=Coefficient of friction
D (or part 92)=Nominal diameter of bolt (inch)

If T=13 ft-lbs, r=0.25, D=0.3125 inch, then W=(13(12))/(0.25(0.3125))=1996.8 lbs (906 kg). In the embodiment shown, each grounding clip 4 has ten teeth driven into the top member 16 and sixteen teeth driven into two solar panels (eight each) for a total of twenty six teeth. Therefore the force per tooth exerted is about 77 lbs (35 kg) per tooth, suitable for causing sufficient penetration of each tooth into its grounding targets (solar panel 36 and top member 16).

In one embodiment, the second angle (in an unstressed condition 44) measures about 55 degrees. The third angle (in an unstressed condition 72) measures about 67 degrees. As nut 38 is tightened, the rotatable plate 26 rotates with respect to the main plate 8 such that the rotatable plate 26 is now disposed at a shallower angle 46 of about 50 degrees to cause the second teeth 34 to penetrate a bottom wall of a solar panel 36 to establish electrical contact with the solar panel 36.

FIG. 10 is a side orthogonal partial cross-sectional view of a grounding assembly 5 as taken from A of FIG. 3, but depicting the arrangement of a pre-assembled grounding assembly 5. FIG. 11 is a side orthogonal partial cross-sectional view of a grounding clip as taken from A of FIG. 3 with the grounding clip fastening system installed. As disclosed elsewhere herein, each first bank of teeth comprises a plurality of first teeth disposed in a plane and extending downwardly and outwardly from one of the two first opposing edges, wherein the plane of the plurality of first teeth are disposed at a first angle with respect to the main plane 8. The first angle (in an unstressed condition 48) as depicted in FIG. 10 measures about 70 degrees. As the nut 38 is tightened, the pair of first banks of teeth 22 penetrate the second channel section 60 of the top member 16, thereby establishing electrical contact with the top member 16. Electrical contact is therefore established between the two shown solar panels 36 and the top member 16.

Figure 12:
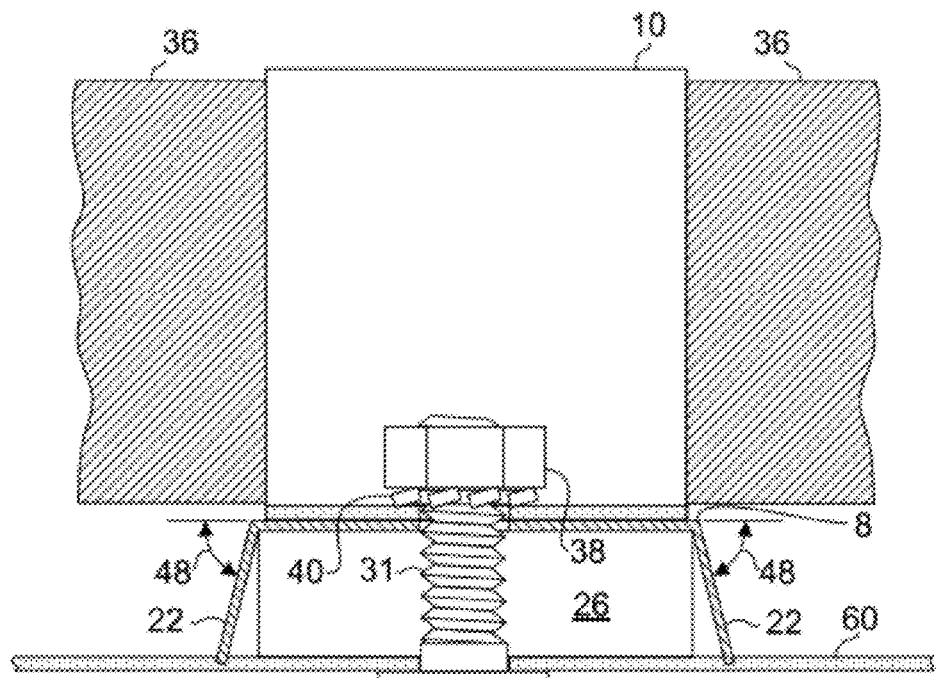
FIG. 12 depicts the use of a stud instead of a screw as depicted in FIG. 11.

FIG. 12 depicts the use of a threaded stud 31 instead of a threaded screw 30 as depicted in FIG. 11. During the construction of the top member 16, a hole is disposed in the second channel section 60 of the top member 16 to enable penetration of the stud 31 bottom up through the hole. The stud 31 is preferably affixed to the top member 16 by friction fit. In other embodiments, the stud 31 may also be affixed to the top member 16 by brazing, soldering or spot welding. In yet another embodiment (shown in FIG. 17 as part 84), a combination of a Penn Engineering & Manufacturing Corp. (PEM®) stud and a plate is used as will be disclosed elsewhere herein. Affixing the stud 31 to the top member 16 simplifies installation and grounding of solar panels as access to the bottom of the top member (for securing the screw 30) will not be necessary. It shall be noted that, in addition to providing grounding, the present grounding clip 4 provides a means for securing a solar panel as penetrations afforded by the first and second banks of teeth 22, 24 into the top member 16 and solar panels 36 prevent relative movement of these components in the main plane.

FIGS. 13, 14, 15 and 16 are top perspective, front orthogonal, top plan and side orthogonal view, respectively, of another embodiment of a grounding clip 86 according to the present invention. This embodiment is essentially the same as the embodiment disclosed in FIGS. 4 and 5 with the exception that the second banks of teeth are further bent upwardly to form bent tips 78 that are disposed in a plane at a fourth angle 80 of about 25 degrees with respect to the plane of the second teeth. In one embodiment, the main plate 8 measures about 1.5 inches (38 mm) in length 100 and about 1.1 inches (28 mm) in width 98. In its unstressed condition, the grounding clip 4 measures about 0.27 inch (7 mm) in height 88.

Figure 13:
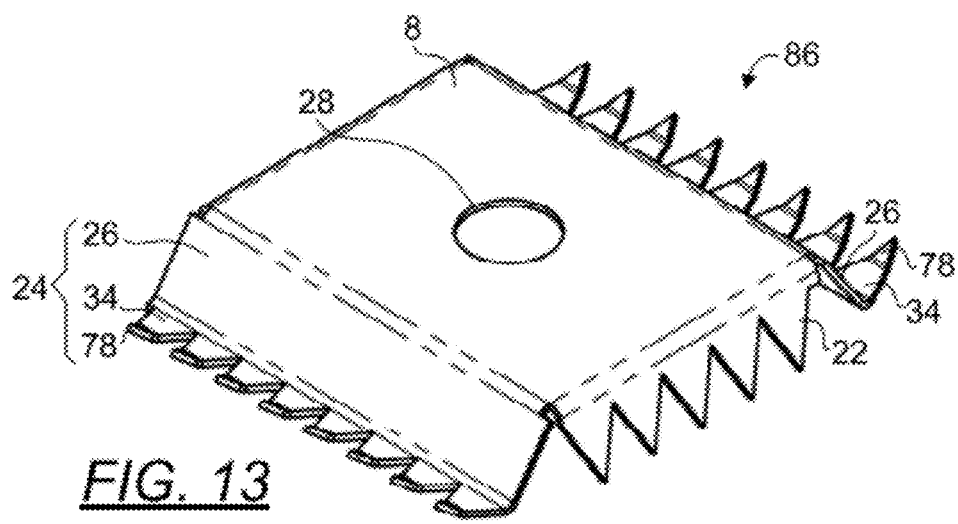
FIG. 13 is a top perspective view of another embodiment of a grounding clip according to the present invention.
Figure 14:
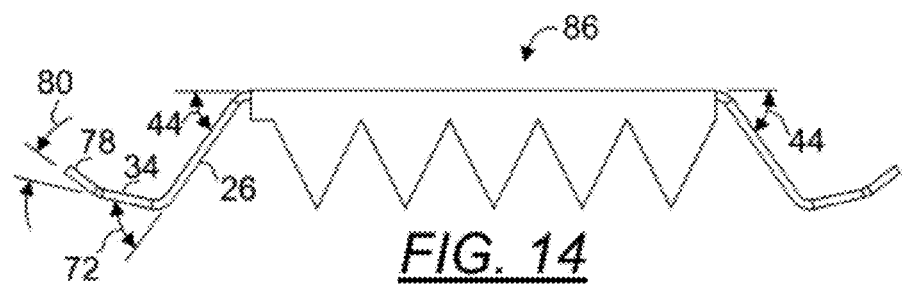
FIG. 14 is a front orthogonal view of the embodiment of grounding clip disclosed in FIG. 13.
Figure 15:
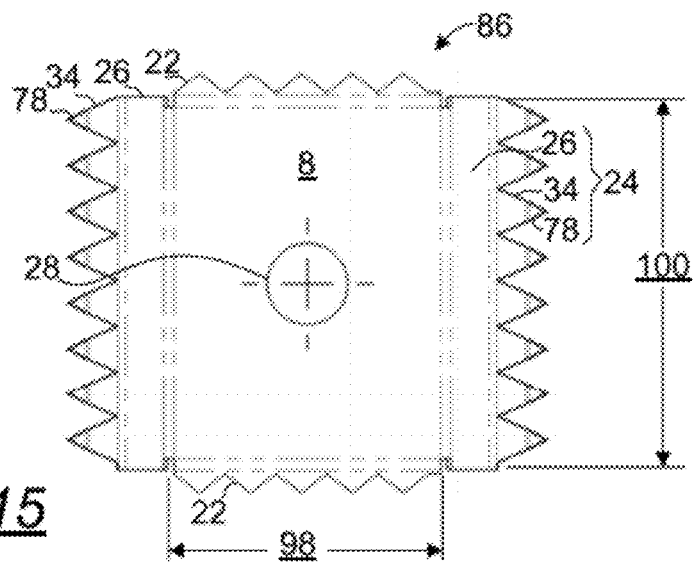
FIG. 15 is a top plan view of the embodiment of grounding clip disclosed in FIG. 13.
Figure 16:
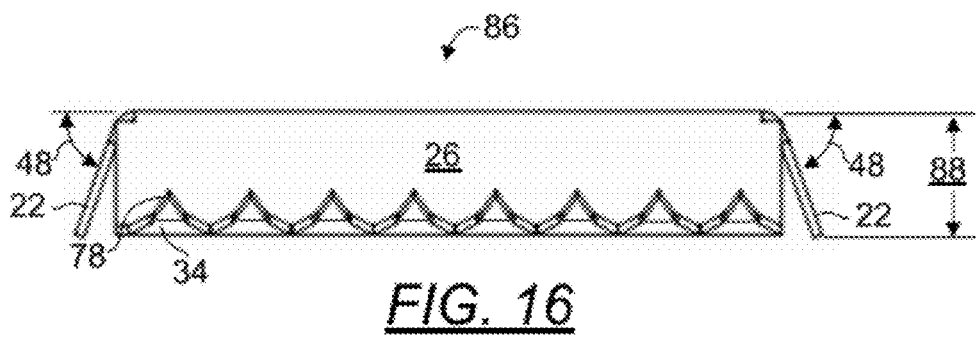
FIG. 16 is a side orthogonal view of the embodiment of grounding clip disclosed in FIG. 13.
Figure 17:
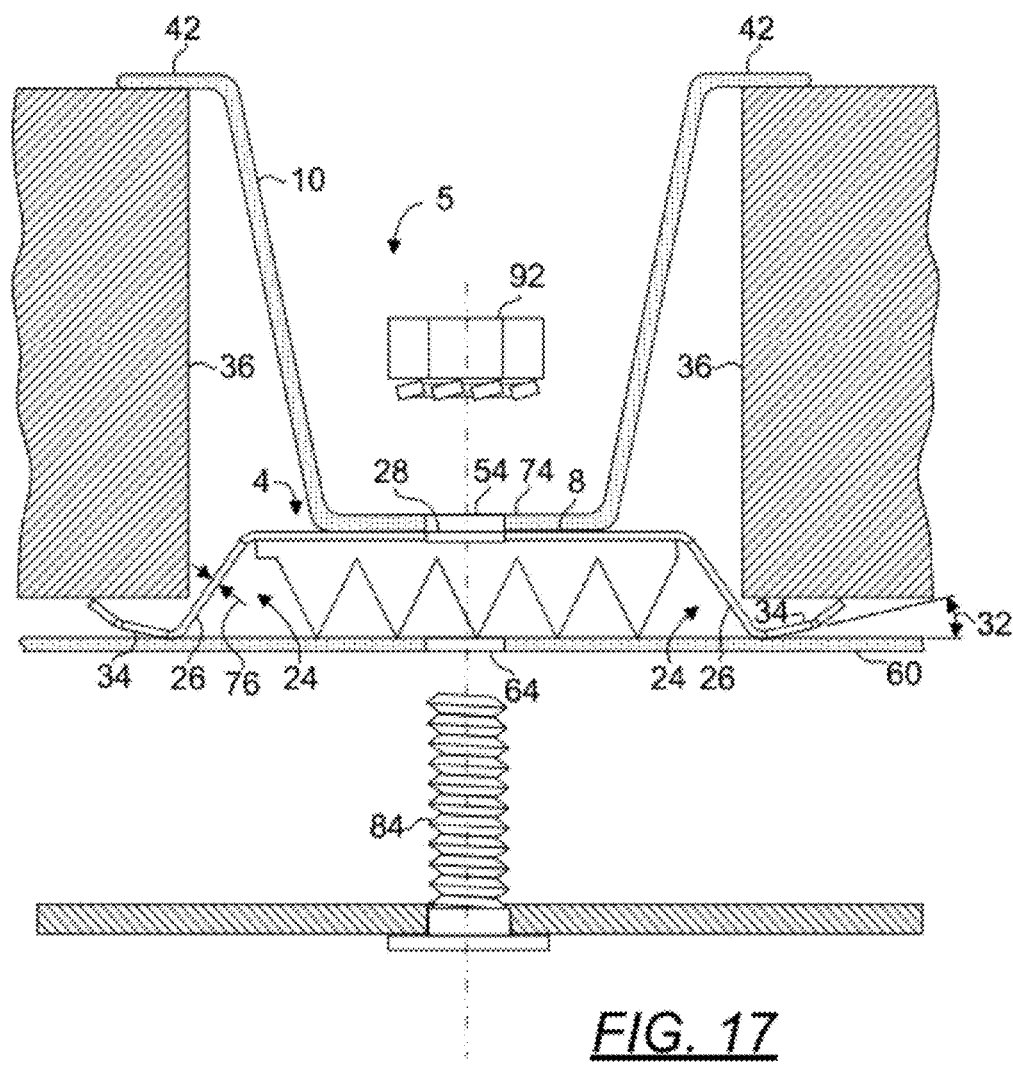
FIG. 17 is a front orthogonal partial cross-sectional view of a grounding assembly using the grounding clip of FIG. 13, but depicting the arrangement of a pre-assembled grounding assembly.
Figure 18:
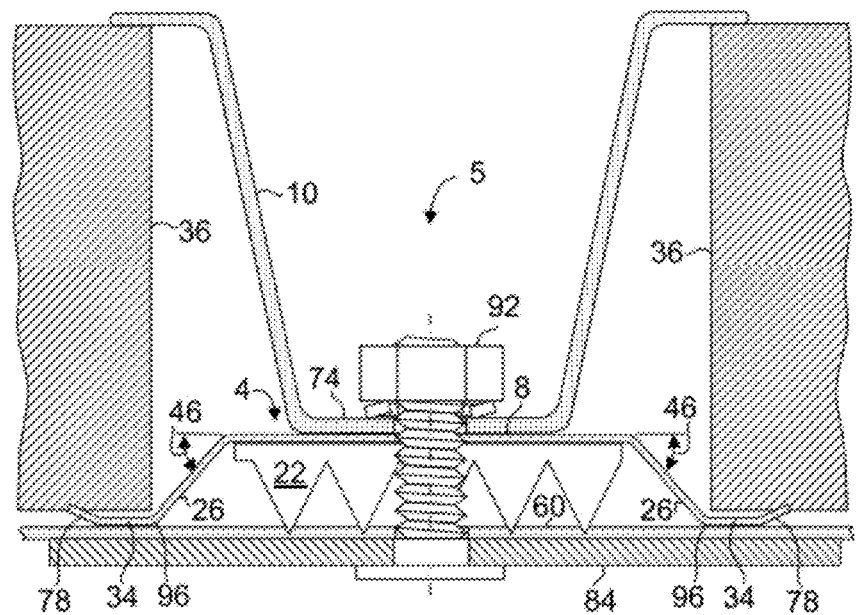
FIG. 18 is a front close-up partial cross-sectional view of a grounding assembly using the grounding clip of FIG. 13.
Figure 19:
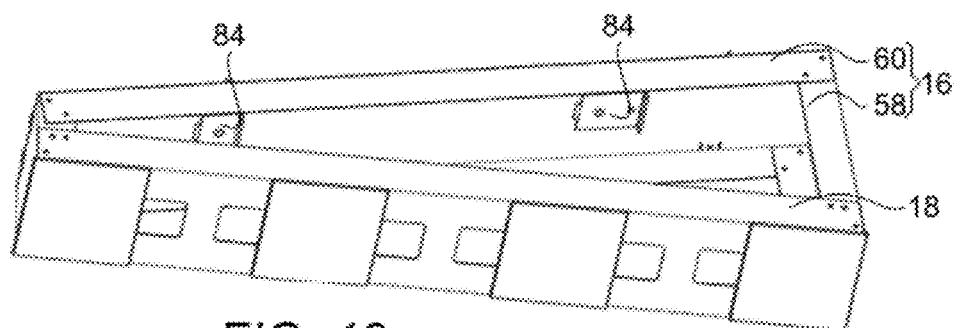
FIG. 19 is a bottom perspective view of a panel support structure depicting the use of plates in one embodiment of the present grounding assembly.

FIG. 17 is a front orthogonal partial cross-sectional view of a grounding assembly 5 using the grounding clip of FIG. 13, but depicting the arrangement of a pre-assembled grounding assembly. When disposed atop the second channel section 60 of the top member 16, the plane of the second teeth is disposed at an angle 32 of about 12 degrees with respect to the second channel section 60 of the top member 16. FIG. 18 is a front close-up partial cross-sectional view of a grounding assembly 5 using the grounding clip of FIG. 13. It shall be noted that at this position, the plurality of second teeth 34 are disposed substantially parallel to the second channel section 60 of the top member 16. The stud of a PEM® stud and plate combination 84 is inserted from the bottom of the second channel section 60 of the top member 16 through aperture 64, center hole 28 of the grounding clip and center hole 54 of the retaining clip 10 to engage a Keps® nut 82. As the Keps® nut 82 is tightened, the first banks of teeth 22 penetrate and electrically bond with a top surface of the second channel section 60 while the rotatable plate 26 presses against and rotates outwardly with respect to the main plate 8. This rotation or flexing motion of the rotatable plate 26 causes the bent tips 78 to penetrate or bite through an anodized layer of a bottom portion of a solar panel 36 to create electrical bond. Applicants discovered that the plate of the PEM® stud and plate combination 84 adequately distributes the load exerted on aperture 64 and its surrounding to avoid point loading that can cause failure of the fastening system 84, 92 resulting from deformation due to high stresses in the top member 16. A failure in aperture 64 can also cause insufficient compression in the grounding clip 4 to create proper bond with the solar panels 36 and second channel section 60 of the top member 16. FIG. 19 is a bottom perspective view of a panel support structure depicting the use of plates of the PEM® stud and plate combination 84 in one embodiment of the present grounding assembly to further clarify the use of such devices to secure grounding clips.

The grounding clip 86 is configured to cooperate with a retaining clip 10 to secure and ground the two solar panels 36. The retaining clip 10 comprises a channel having a base 74 and two flared edges 42. The retaining clip 10 is affixed at the base 74 to the main plate 8 to form two clamps where each clamp is defined by one of the two flared edges 42 and a second bank of teeth 24 and configured to secure one of the solar panels 36.

Figure 20:
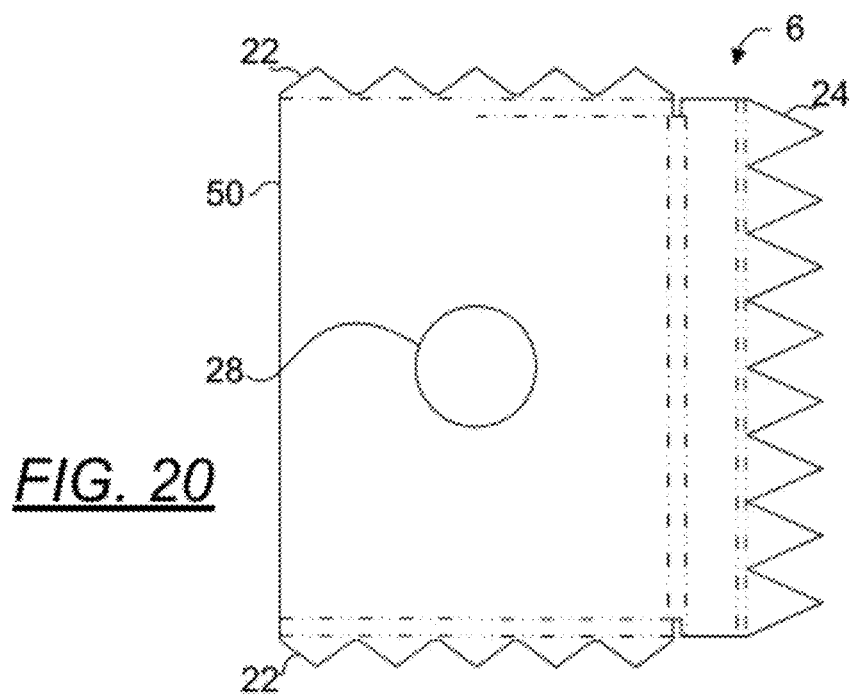
FIG. 20 depicts a top plan view of an edge grounding clip according to the present invention.
Figure 21:
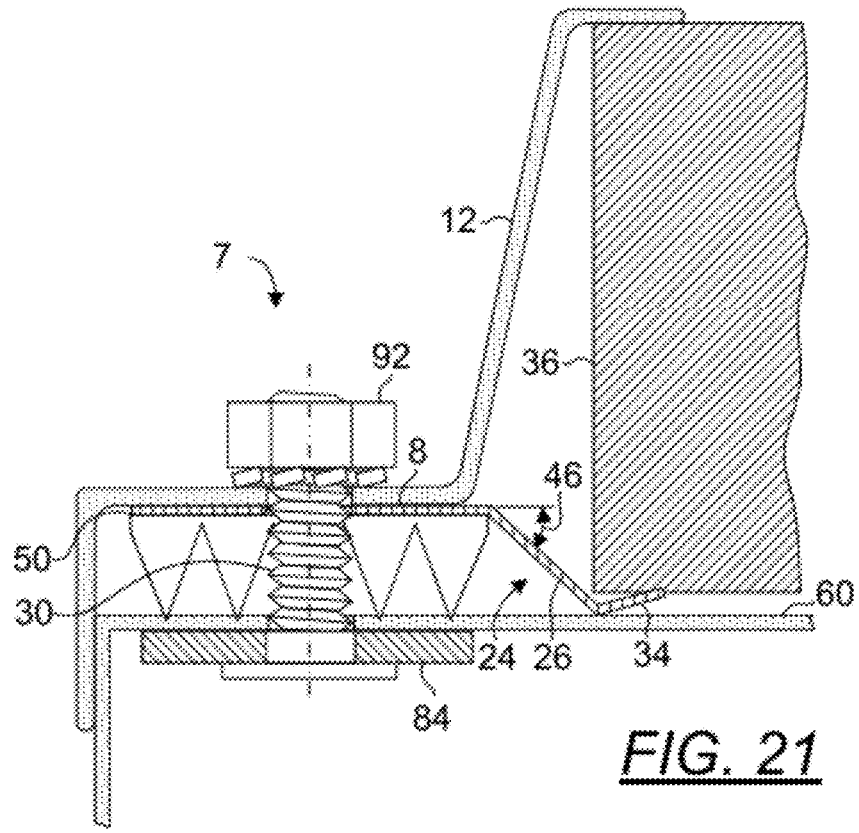
FIG. 21 is a front close-up partial cross-sectional view of an edge grounding clip as taken from B of FIG. 3.

FIG. 20 depicts a top plan view of an edge grounding clip 6 according to the present invention. An edge grounding clip 6 is used in combination with an edge retaining clip 12 to constitute an edge grounding assembly 7. As bonding is only required on one edge of an edge grounding clip 6, one of the second banks of teeth is rendered unnecessary. FIG. 21 is a front close-up partial cross-sectional view of an edge grounding clip 6 as taken from B of FIG. 3. On an edge of a row of panel support structures, an edge retaining clip 12 is disposed atop an edge grounding clip 6 and secured to the second channel section 60 of the top member 16 using a screw 30, friction washer 40 and clamp nut 38. Similar to a grounding assembly 5 disclosed earlier, an edge grounding assembly 7 physically secures an edge of a solar panel 36 while grounding the solar panel 36. The edge grounding clip 6 is essentially identical to the grounding clip 4 with the exception that the edge grounding clip 6 lacks a second bank of teeth 24 on edge 50 as it is designed to ground a solar panel 36 on only one side. An edge retaining clip 12 is positioned over an edge grounding clip 6. The edge retaining clip 12 is constructed in the shape of a two stair steps with the lower step positioned over a top surface portion or a side surface portion of the second channel section 60 of the top member 16. The edge retaining clip 12 is similar to a retaining clip 10 except one of the two flared edges 42 is no longer required. In the installed position, the lower step of the edge retaining clip 12 abuts snugly with the second channel section 60 of the top member 16.

Figure 22:
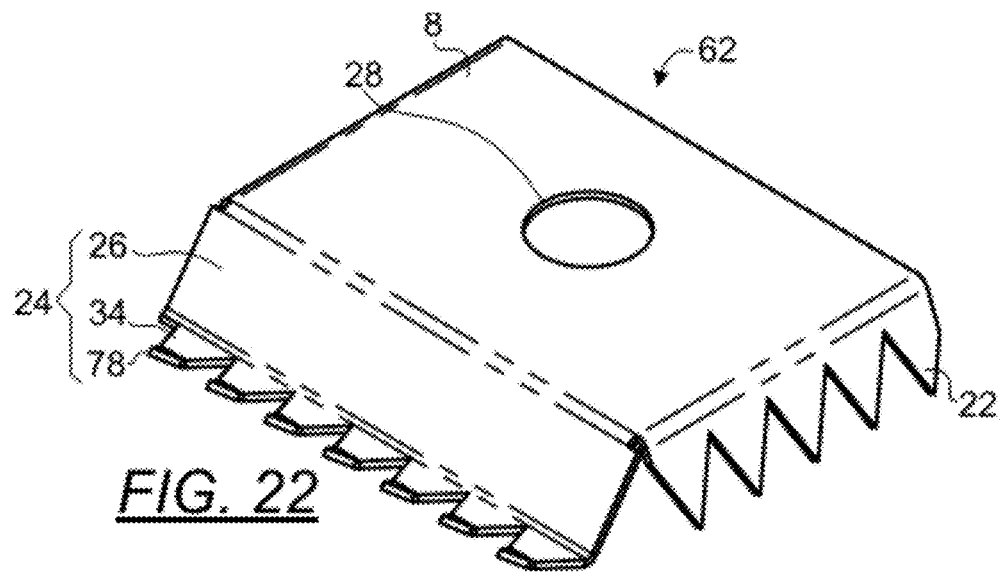
FIG. 22 is a top perspective view of another embodiment of an edge grounding clip according to the present invention.
Figure 23:
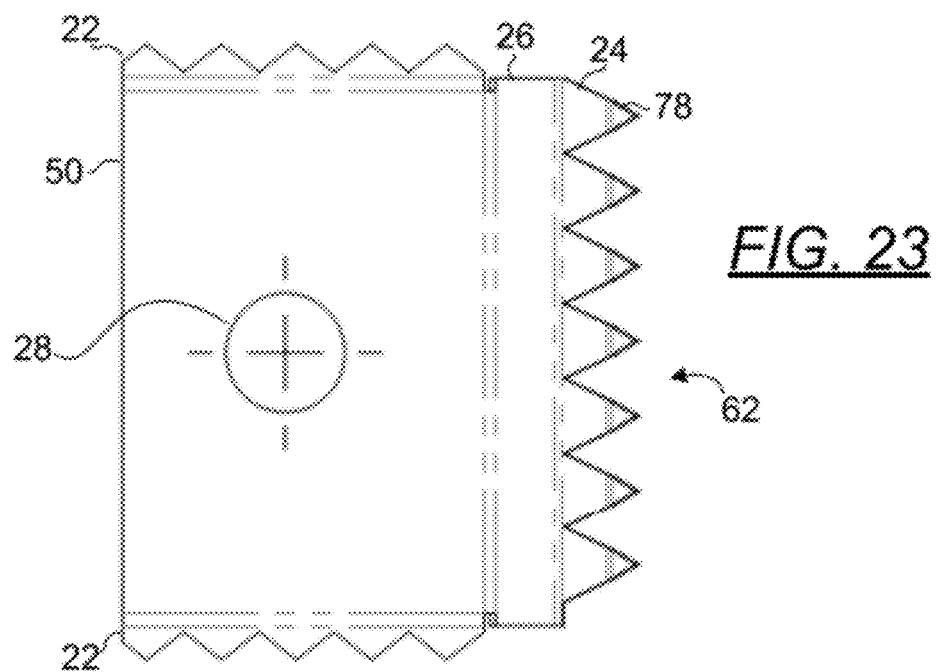
FIG. 23 is a top plan view of the embodiment of the edge grounding clip of FIG. 22.
Figure 24:
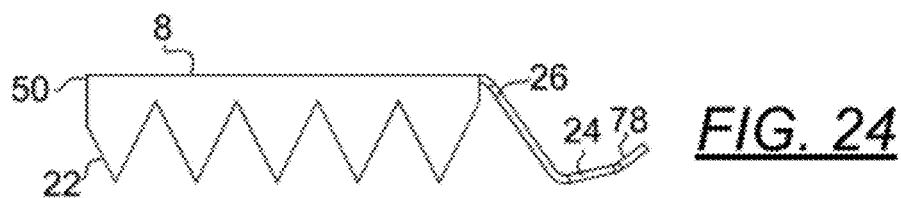
FIG. 24 is a front orthogonal view of the embodiment of the edge grounding clip of FIG. 22.

FIGS. 22, 23 and 24 are top perspective, top plan and front orthogonal view, respectively, of another embodiment of an edge grounding clip 62 according to the present invention. In this embodiment, the second bank of teeth 24 is essentially same as the any one of the pair of second banks of teeth 24 of the grounding clip 86 depicted in FIG. 14 as edge 50 also absent a second bank of teeth 24.

In one embodiment, the present grounding clip 4 is constructed from a metal sheet. A blank is stamped out from the metal sheet. The metal sheet preferably measures a thickness 76 of about 0.02 inch (0.5 mm). Two opposing edges are first bent to form the downwardly extending pair of first banks of teeth 22. Two remaining opposing edges are then bent to form the rotatable plates 26 of the pair of second banks of teeth 24. Each of the rotatable plates 26 is then further bent to form the plurality of second teeth whose plane is disposed at a third angle to the rotatable plate 26. In one embodiment, the plurality of second teeth are further bent to form the bent tips 78 disposed in a plane at a fourth angle with respect to a plane corresponding to the plurality of second teeth. In another embodiment, a grounding clip is molded.

Therefore, each grounding clip 4 is formed by: (1) stamping a blank from a metal sheet and (2) performing the bending steps either as a single step or a series of steps. In another embodiment, the two steps disclosed above are combined in a single step of stamping a blank from a metal sheet and stamping the blank in a mold to form the necessary pairs of banks of teeth.

We claim:

1. A grounding clip for electrically bonding at least three objects in one action, said grounding clip comprising:
   (a) a planar body disposed in a plane;
   (b) a pair of opposingly disposed first banks of teeth, wherein each first bank of teeth is disposed in a plane and extending downwardly and outwardly from said planar body at a first angle with respect to said planar body; and
   (c) a pair of opposingly disposed second banks of teeth, wherein each second bank of teeth comprises a rotatable plate disposed in a plane and at a second angle with respect to said planar body and extending downwardly and outwardly from said planar body and terminating in a plurality of second teeth disposed upwardly in a plane and at a third angle with respect to said rotatable plate, wherein said grounding clip is interposed between said at least three objects and said grounding clip is disposed with each of said pair of first banks of teeth facing one of said three objects and when a force is applied substantially perpendicularly to said plane of said planar body, said pair of second banks of teeth is adapted to rotate outwardly from said planar body and cause electrical grounding with the other ones of said at least three objects and said first, second and third angles are configured to prevent relative movement of said at least three objects in said plane of said planar body and said second angle is configured to enable rotation of said rotatable plate.

2. The grounding clip of claim 1, wherein said plurality of second teeth are bent upwardly in a plane disposed at a fourth angle of about 25 degrees with respect to said rotatable plate.

3. The grounding clip of claim 1, wherein said first angle measures about 70 degrees.

4. The grounding clip of claim 1, wherein said second angle measures about 55 degrees.

5. The grounding clip of claim 1, wherein said third angle measures about 67 degrees.

6. The grounding clip of claim 1, wherein said grounding clip is constructed from stainless steel.

7. The grounding clip of claim 1, wherein each of said planar body, said pair of first banks of teeth and said pair of second banks of teeth has a thickness of about 0.02 inch (0.5 mm).

8. The grounding clip of claim 1, wherein each of said pair of first banks of teeth and said plurality of second teeth comprises a tooth density of from about 3 points per inch (25.4 mm) to about 20 points per inch (25.4 mm), and a tooth apex angle of about 46 degrees.

9. A grounding clip for electrically bonding a first object, a second object and a third object, wherein said first and second objects are substantially levelly disposed and are disposed above said third object, said grounding clip comprising:
   (a) a main plate having a plurality of edges, wherein said main plate is disposed in a main plane;
   (b) a pair of first banks of teeth disposed on two first opposing edges of said main plate, wherein each first bank of teeth comprises a plurality of first teeth extending downwardly and outwardly from one of said two first opposing edges, said plurality of first teeth are disposed in a plane at a first angle with respect to said main plane; and
   (c) a pair of second banks of teeth disposed on two second opposing edges of said main plate, wherein each second bank of teeth comprises a rotatable plate disposed in a plane extending downwardly and outwardly from one of said two second opposing edges and a plurality of second teeth affixed to a free edge of said rotatable plate, wherein said plurality of second teeth are disposed in a plane at a second angle with respect to said main plane and said plane of said plurality of second teeth is disposed at a third angle with respect to said plane of said rotatable plate, wherein said grounding clip is interposed between said first, second and third objects and said pair of first banks of teeth facing said third object and when a force is applied substantially normally to said main plate, said pair of second banks of teeth is adapted to rotate outwardly from said main plate and cause electrical grounding with said first and second objects and said pair of first banks of teeth is adapted to cause electrical grounding with the third object and said first, second and third angles are configured to prevent relative movement of said first, second and third objects in said main plane and said second angle is configured to enable rotation of said rotatable plate.

10. The grounding clip of claim 9, wherein said plurality of second teeth are bent upwardly in a plane disposed at a fourth angle of about 25 degrees with respect to said rotatable plate.

11. The grounding clip of claim 9, wherein said first angle measures about 70 degrees.

12. The grounding clip of claim 9, wherein said second angle measures about 55 degrees.

13. The grounding clip of claim 9, wherein said third angle measures about 67 degrees.

14. The grounding clip of claim 9, wherein said grounding clip is constructed from stainless steel.

15. The grounding clip of claim 9, wherein said grounding clip is configured to cooperate with a retaining clip to prevent relative movement between said first and second objects and ground said first and second objects, said retaining clip comprising a channel having a base and two opposingly disposed flared edges, wherein said retaining clip is affixed at said base to said main plate to form two clamps, wherein each clamp is defined by one of said two flared edges and a second bank of teeth and configured to secure one of said first and second objects.

16. The grounding clip of claim 9, wherein said main plate is a rectangular plate.

17. The grounding clip of claim 9, wherein each of said pair of first banks of teeth and said plurality of second teeth comprises a tooth density of from about 3 points per inch (25.4 mm) to about 20 points per inch (25.4 mm), and a tooth apex angle measures about 46 degrees.

18. The grounding clip of claim 9, wherein each of said main plate, said pair of first banks of teeth and said pair of second banks of teeth has a thickness of about 0.02 inch (0.5 mm).

19. The grounding clip of claim 9, wherein said main plate comprises a hole centrally disposed on said main plate.

20. The grounding clip of claim 19, wherein the total number of teeth of said pair of first and second banks teeth is about 26.

* * * * *